UNITED STATES PATENT OFFICE.

JOKICHI TAKAMINE, OF NEW YORK, N. Y.

PROCESS IN MAKING DIASTATIC PRODUCT.

1,192,584. Specification of Letters Patent. Patented July 25, 1916.

No Drawing. Continuation of application Serial No. 548,402, filed March 10, 1910. This application filed July 1, 1912. Serial No. 707,053.

*To all whom it may concern:*

Be it known that I, JOKICHI TAKAMINE, a subject of the Emperor of Japan, and a resident of New York city, borough of Manhattan, in the county and State of New York, have invented a new and useful Process in Making Diastatic Product, of which the following is a specification.

This application includes the same invention set forth in my prior application Serial Number 548,402, filed March 10, 1910, and is filed as a continuation of my said prior application.

In my United States Patent No. 525,823, dated September 11, 1894, I have described a process of making the soluble ferment in concentrated form possessing the power of transforming starch into sugar. I have now discovered an improvement in said process whereby the product may be obtained of a diastatic strength at least twice as great as that heretofore obtainable.

The following is a description of the manner in which I prefer at present to carry out my new process. I employ spores of the genus *Aspergillus* and particularly prefer the species *Aspergillus oryzæ* of pure culture because it excels any other species with regard to the production of diastase in abundance. Therefore, in the following examples of my invention, I will employ, for convenience, *Aspergillus oryzæ*, but do not wish to be understood as limiting myself thereto.

*Example No. 1 of producing the koji.*—I take a suitable culture medium, such as wheat bran. This I moisten with salt water so as to contain from 60 to 80 parts by weight of water to bran, so that a given weight of the thus moistened bran will contain about 38 to 45% of water. If the salt employed be sodium chlorid, the amount should be from 1/2 to 1% by weight of salt to bran before moistening. To the bran so moistened is then added about from 1/2000 to 1/1000 part of its weight of the spores of the fungus and the mass is then well mixed. Before mixing in the spores, the bran should be steamed with live steam in order to sterilize the mass with the object of preparing the product in a purer form. After thoroughly mixing with the spores of the fungus, the bran is placed in a room with the temperature ranging from 25 to 30° C., and the air saturated or nearly saturated with moisture; the mass being spread out in layers of from 1 to 4 inches in thickness on the floor or shelves. The thickness of the layers is determined by the nature of the bran and whether it is steamed. The mass being left in this condition gradually heats up owing to he growth of the fungus. The condition of the air in the room is so regulated that the temperature of the mass is not allowed to go higher than about 42° C. In keeping the temperature of the mass within the limit of 40° C. it will be found necessary to have the layer of the mass from one to one and one-half inches thick unless special cooling system is provided for. After from 30 to 50 hours during which the mass is left undisturbed, the fungus growth has advanced to its greatest extent, and an abundant production of the enzym has taken place. The mass thus obtained may be dried in any suitable way, as by the agency of dry air, taking care that the temperature is not permitted to rise to a degree which would injure the diastatic properties of the mass.

*Example No. 2 of producing the koji.*—In lieu of the foregoing example of the first part of my process, I prefer, however, to proceed as follows for the purpose of obtaining the koji of the improved kind described in my application for patent Serial Number 541,617, filed February 2, 1910.

I take a suitable culture medium, such as wheat bran, moistened with water so as to contain from 60 to 80 parts by weight of water to bran, so that a given weight of the thus moistened bran will contain about 38 to 45% of water. This is sterilized and, after cooling to about 30° C., an antiseptic, such as formaldehyde, is added in about the proportion of one part formaldehyde to 3000 parts of the moistened medium. A pure culture of *Aspergillus oryzæ* is introduced upon the medium and the whole is kept in an incubator at a temperature of from 28 to 30° C. which latter is the optimum temperature for the growth of *Aspergillus oryzæ*. When the growth is completed and the greenish yellow spores are produced, a culture of the same is introduced upon a fresh culture medium of the same composition and containing the same proportion of formaldehyde. At least four or five generations of the growth are repeated in the same manner, employing substantially the same proportion of formaldehyde. In this manner, the spores become acclimated to that proportion of formaldehyde or substantially immune against its effects. Subsequent generations of the growth are then produced under an increase of the proportion of formaldehyde. Thus, a culture of the previously produced spores is introduced upon a fresh culture medium made as above excepting that the proportion of antiseptic is about one part of formaldehyde to 2900 parts of the moist medium. At least four or five generations of growth are produced at this proportion of antiseptic. Similar operations are repeated until the proportion of antiseptic has increased to about one part of formaldehyde to 1500 parts of the moist medium; each decrement in the proportion of moist medium being about 100 parts and there being at least four or five generations grown at each proportion before the next succeeding increase. By this gradual and step by step increase of the antiseptic, the spores become acclimatized or substantially immune to the proportion of antiseptic at each step before the next succeeding step is taken and in this way spores which, at the outset, would not have grown in the presence of a proportion of 1 to 1500 or less formaldehyde, attain the capacity of satisfactory growth under those conditions.

When the maximum acclimatization has been reached it can be determined by observing that any further increase in the proportion of antiseptic prevents the growth of the fungi.

Having reached the maximum acclimatization when any further increase of proportion of antiseptic would interfere with the growth of the fungus, the spores contained in the product may be separated from the culture medium preparatory to the succeeding step or otherwise. This may be done by sifting through fine sieves, after drying; the separated spores being obtained as microscopic particles of a greenish yellow color.

The acclimatized spores obtained by the foregoing operations, either separated from the culture medium on which they were produced or otherwise, are introduced upon a new culture medium compound, as before, of sterilized and cooled wheat bran combined with 60 to 80 parts by weight of salt water and one part or less by weight of formaldehyde to from 3000 to 1500 parts of the moist medium and the whole kept in an incubator at a temperature of from 28 to 30° C. For moistening, I prefer salt water to ordinary water for the reason that the diastatic yield is materially increased, as will be more fully described later. If salt water be employed, the amount of the salt (sodium chlorid) should be about from 1/2 to 1% of the dry bran. The temperature gradually rises as the growth proceeds until it attains a temperature of 40 to 43° C. when the growth proceeds at maximum speed. At the end of about 48 hours, the culture medium will be substantially covered with a growth of the white mycelial fungus of a white silky luster. This is the koji which may be employed in the succeeding step, either dried or otherwise. The medium to be used for the above process should be neutral or slightly acid since any alkalis or ammonia bases, organic or inorganic is prejudicial to the diastatic enzym secreted by the fungus growth. If the medium is acidulated with any organic acids such as acetic, tartaric, citric acid, etc., even such an amount as amounting to 1% of the medium, calculated as dried matter, does not materially injure the strength of distances formed with the growth of the fungus. Inorganic acids are as a rule prejudicial to diastase and they should be avoided for use except in a quantity not exceeding 1/10% of the medium, calculated as dried matter. Phosphoric acid, however, does not show so much injury to the diastatic strength and can be used even to 1/2% of the medium, calculated as dried matter.

Acidity of medium is more favorable for the fungus growth compared to the neutral medium, therefore, in practice more or less acidity is maintained in the medium.

*Example of producing the soluble ferment from the above koji.*—From the dried or undried (preferably undried) koji mass obtained according to either of the foregoing examples, the soluble ferment is extracted by treating the same with water or water mixed with alcohol. This may be done by permitting the liquid to percolate through the mass, or by steeping the mass in the liquid. The strength of this solution may be increased by repeatedly treating a fresh quantity of the mass therewith. A solution containing from thirty to thirty-five per cent. of soluble solid matter may thus be readily obtained. The object of making the extract of such great strength as above described is to economize the quantity of alcohol to be used in the subsequent stage of the process described below. In order to further economize the alcohol to be used, I may also further concentrate the already strong extract by evaporation by suitable means at a temperature not to exceed 50° C., that is, at a temperature at which the diastatic enzym is not injured; so as to form a thick syrup or semi-solid. In this concentrated state also the water extract of the crude enzym can be preserved without change, before precipitation with alcohol; and consequently the subsequent precipitation with alcohol is not required to be immediately proceeded with, as would be the case if weak watery extract were prepared. This solution may be still further concentrated and strengthened by evaporation at a low temperature into a syrupy form. To the solution thus obtained, a sufficient quantity, which is usually about one and a half to three times its volume of alcohol containing from 90 to 95% absolute alcohol, by volume, is added and agitated until the diastatic enzym is precipitated. Flocculent solid matter or not infrequently a sticky mass consisting mainly of diastatic enzym, but also of traces of dextrin, mineral matter, etc., is precipitated. The precipitate may be allowed to settle, and is separated from the supernatant liquid by decantation and filtration or it may be wholly separated by filtration. It is then washed with alcohol containing 85% of absolute alcohol to free it from adhering materials. The mass can be dried slowly at a low temperature in a dry room, preferably in a vacuum drier suitable for the purpose, or may be dehydrated by strong alcohol, by which latter means the article can be at once obtained in a powdery form. When dehydration is carried on by the latter means it is preferable to employ the extract in less concentration disregarding the economization of alcohol. The concentration in such case is found to be the best when the solid extractive matter amounts to 15 to 20 parts of the fluid. The article may be purified further by redissolving it in water, and re-precipitating and washing it with alcohol and drying, thus repeating the process as above followed out in the first precipitation. The article thus obtained is an amorphous dry mass, or powder, of almost white or light yellowish brown color. It is readily soluble in water and possesses the power of transforming gelatinized starch into sugar.

The article is distinguished from malt diastase by its very slight presentation of the characteristic property of giving blue coloration with the tincture of guaiacum mixed with hydrogen peroxid.

In practising the process above described, the following precautions and possible variations may be mentioned: The incubator is so arranged as to saturate the air with aqueous vapor to a maximum so as to keep the culture always moist; also it should be well ventilated so as to permit the escape of carbon dioxid and supply abundance of air; also as large a surface of the culture medium as possible should be exposed to the air. This can be done by spreading on trays to a thickness of about 1 to 3 inches. Within 12 to 16 hours, the growth starts and the temperature goes rapidly up until it not infrequently reaches 42 to 43° C. It is desirable to keep the temperature as near as possible to 30° C. since too high a temperature will for a while slacken the growth of the fungus; but higher temperature than 30° C. and not exceeding 42° C. does not considerably affect the final result as far as diastatic strength is concerned.

The reason for the conditions last described is because *Aspergillus oryzæ* fungi need a sufficient supply of oxygen and a large culture surface during growth. These conditions, however, would lead as an unavoidable consequence to the mass being affected and contaminated with foreign fungi and bacteria, were their growth not temporarily or permanently prevented by the presence of that proportion of antiseptic to which the *Aspergillus oryzæ* have been rendered immune by the acclimatization.

As some of the antiseptics which may be substituted for formaldehyde, I may mention hydrofluoric, benzoic or salicylic acid By this acclimatization, the spores may be made immune to hydrofluoric acid in the proportion of 1 to 1/2000 by weight of the moist culture medium and to benzoic or salicylic acid in the proportion of 1 to 500 and even of 1 to 300. I prefer formaldehyde because it is dissipated from the mass by the time the koji growth is complete by partial volatilization and also because of its combining power with protein matters.

In place of wheat bran, I may substitute comminuted grains of cereals but the bran of cereals I prefer on account of its volume which affords larger surface for the growth of the fungi. I do not, however, limit myself to these substances since I believe that any substance which at the same time presents sufficient surface and affords sufficient nutriment for the fungi may be employed for the culture medium, such as dried distillers' or brewers' slop, etc., with addition of 20–30% of bran or cereals.

The salt employed may be sodium chlorid or other suitable salt, such, for example, as sodium fluorid or other halids or alkalis or alkaline earths, or equivalents compatible with a neutral or slightly acid condition during the progress of the growth.

According to my experiments, the use of the sodium chlorid in the process does not appear to appreciably accelerate the diastatic strength of the koji, but the presence of the sodium chlorid with the koji greatly increases the yield of the soluble ferment. At the same time, the use of the salt does not appear to increase the percentage of inorganic substance in the soluble ferment.

Where the acclimatized koji prepared according to above Example 2, is employed in making the soluble ferment, I have found the diastatic strength to be more than double that obtained according to the process of said Patent No. 525,823, while the inorganic contents were very much less and when sodium chlorid was employed in making the new koji, I have found the yield of the product materially increased while the inorganic contents were very much less.

What I claim and desire to secure by Letters Patent of the United States is:—

1. As a new composition of matter, a non-alkaline composition of salt and fungi characterized by the possession of starch converting enzyms combined with an abnormal resistance to antiseptic power.

2. As a new composition of matter, a non-alkaline composition of salt with koji characterized by the possession of starch converting enzyms combined with an abnormal resistance to antiseptic power.

3. The improvement in the manufacture of diastase containing starch converting enzyms, which consists in increasing the yield of diastase by growing a fungus possessing starch converting enzyms on a suitable culture medium moistened with a salt solution, and under non-alkaline conditions.

4. The improvement in the manufacture of diastase containing starch converting enzyms, which consists in increasing the yield of diastase by growing a fungus possessing starch converting enzyms on a suitable culture medium moistened with a solution of sodium chlorid, and under non-alkaline conditions.

5. The improvement in the manufacture of diastase containing starch converting enzyms, which consists in increasing the yield of diastase by growing a fungus possessing starch converting enzyms on a suitable culture medium moistened with a salt solution, under non-alkaline conditions and in presence of antiseptic.

6. The improvement in the manufacture of diastase containing starch converting enzyms in order to increase the yield of diastase, which consists in growing a fungus possessing starch converting enzyms on a suitable culture medium moistened with salt in solution, the amount of salt employed being from about one half per cent. to one per cent. of the medium, and under non-alkaline conditions.

7. The improvement in the manufacture of diastase containing starch converting enzyms, which consists in increasing the yield of diastase by growing Aspergillus fungus possessing starch converting enzyms in the presence of salt and antiseptic under non-alkaline conditions.

8. The improvement in the manufacture of diastase containing starch converting enzyms in order to increase the yield of diastase, which consists in growing a fungus possessing starch converting enzyms on a suitable non-alkaline culture medium moistened with a small percentage of salt in solution under non-alkaline conditions and in presence of antiseptic.

9. The improvement in the growing of fungus producing koji, which consists in growing the fungus *Aspergillus oryzæ* in the presence of salt under non-alkaline conditions.

10. The improvement in the growing of fungus producing koji, which consists in growing the fungus *Aspergillus oryzæ* in the presence of salt and an antiseptic under non-alkaline conditions.

11. The improvement in the growing of fungus producing koji, which consists in growing repeated generations of *Aspergillus oryzæ*, in the presence of salt and increasing proportions of antiseptic, and growing the koji from the spores thus produced in the presence of salt and antiseptic under non-alkaline conditions.

In testimony whereof I have hereunto signed my name.

JOKICHI TAKAMINE.

Copies of this patent may be obtained for five cents each, by addressing the "Commissioner of Patents, Washington, D. C."

ing the new koji, I have found the yield of the product materially increased while the inorganic contents were very much less.

What I claim and desire to secure by Letters Patent of the United States is:—

1. As a new composition of matter, a non-alkaline composition of salt and fungi characterized by the possession of starch converting enzyms combined with an abnormal resistance to antiseptic power.

2. As a new composition of matter, a non-alkaline composition of salt with koji characterized by the possession of starch converting enzyms combined with an abnormal resistance to antiseptic power.

3. The improvement in the manufacture of diastase containing starch converting enzyms, which consists in increasing the yield of diastase by growing a fungus possessing starch converting enzyms on a suitable culture medium moistened with a salt solution, and under non-alkaline conditions.

4. The improvement in the manufacture of diastase containing starch converting enzyms, which consists in increasing the yield of diastase by growing a fungus possessing starch converting enzyms on a suitable culture medium moistened with a solution of sodium chlorid, and under non-alkaline conditions.

5. The improvement in the manufacture of diastase containing starch converting enzyms, which consists in increasing the yield of diastase by growing a fungus possessing starch converting enzyms on a suitable culture medium moistened with a salt solution, under non-alkaline conditions and in presence of antiseptic.

6. The improvement in the manufacture of diastase containing starch converting enzyms in order to increase the yield of diastase, which consists in growing a fungus possessing starch converting enzyms on a suitable culture medium moistened with salt in solution, the amount of salt employed being from about one half per cent. to one per cent. of the medium, and under non-alkaline conditions.

7. The improvement in the manufacture of diastase containing starch converting enzyms, which consists in increasing the yield of diastase by growing Aspergillus fungus possessing starch converting enzyms in the presence of salt and antiseptic under non-alkaline conditions.

8. The improvement in the manufacture of diastase containing starch converting enzyms in order to increase the yield of diastase, which consists in growing a fungus possessing starch converting enzyms on a suitable non-alkaline culture medium moistened with a small percentage of salt in solution under non-alkaline conditions and in presence of antiseptic.

9. The improvement in the growing of fungus producing koji, which consists in growing the fungus Aspergillus oryzæ in the presence of salt under non-alkaline conditions.

10. The improvement in the growing of fungus producing koji, which consists in growing the fungus Aspergillus oryzæ in the presence of salt and an antiseptic under non-alkaline conditions.

11. The improvement in the growing of fungus producing koji, which consists in growing repeated generations of Aspergillus oryzæ, in the presence of salt and increasing proportions of antiseptic, and growing the koji from the spores thus produced in the presence of salt and antiseptic under non-alkaline conditions.

In testimony whereof I have hereunto signed my name.

JOKICHI TAKAMINE.

Copies of this patent may be obtained for five cents each, by addressing the "Commissioner of Patents, Washington, D. C."

---

It is hereby certified that in Letters Patent No. 1,192,584, granted July 25, 1916, upon the application of Jokichi Takamine, of New York, N. Y., for an improvement in "Processes in Making Diastatic Products," errors appear in the printed specification requiring correction as follows: Page 1, line 61, for the word "he" read *the;* page 2, line 86, for the word "distances" read *diastase;* and that the said Letters Patent should be read with these corrections therein that the same may conform to the record of the case in the Patent Office.

Signed and sealed this 22d day of August, A. D., 1916.

[SEAL.]

F. W. H. CLAY,

*Acting Commissioner of Patents.*

It is hereby certified that in Letters Patent No. 1,192,584, granted July 25, 1916, upon the application of Jokichi Takamine, of New York, N. Y., for an improvement in "Processes in Making Diastatic Products," errors appear in the printed specification requiring correction as follows: Page 1, line 61, for the word "he" read *the;* page 2, line 86, for the word "distances" read *diastase;* and that the said Letters Patent should be read with these corrections therein that the same may conform to the record of the case in the Patent Office.

Signed and sealed this 22d day of August, A. D., 1916.

[SEAL.]

F. W. H. CLAY,

*Acting Commissioner of Patents.*

Cl. 167—7.